UNITED STATES PATENT OFFICE.

WILLIAM LITTLE, OF STRAND, ENGLAND.

LUBRICATING MATERIAL.

Specification forming part of Letters Patent No. 11,406, dated August 1, 1854.

*To all whom it may concern:*

Be it known that I, WILLIAM LITTLE, of Strand, in the county of Middlesex, England, a subject of the Queen of Great Britain, have invented or discovered certain new and useful Improvements in the Manufacture of Lubricating Material; and I, the said WILLIAM LITTLE, do hereby declare the nature of the said invention and in what manner the same is to be performed are fully described and ascertained in and by the following statement thereof—that is to say:

The products of the distillation of coal-tar resulting from the single distillation of bituminous coal or substances of like nature are pitch, coal-oil, and naphtha. The lighter product, or that which first distills over, is the naphtha, or coal-naphtha, the heavier oil being known in commerce under the name of "coal-oil."

The nature of my invention consists in combining the heavier oily product of the second distillation of coal (or any other bituminous or vegetable substance that produces an oil essentially like the coal-oil) with a saponified animal or vegetable or fish oil or fat, for the purpose of making the compound a good and cheap lubricator for machinery. The crude oils or tar resulting from the first distillation I subject to redistillation in an iron or copper still, and after setting aside the early products, which consist of a thin spirit or oil, I take the remainder, which is more or less greasy to the touch, and I combine this greasy oil in various proportions with soapy compounds of animal, fish, or vegetable oils or fats with soda or potash, and I employ these soapy compounds for combining with the greasy oil, either together or separately, and I proceed as follows: To one hundred parts of tallow melted in a caldron I add two hundred and thirty-five parts of a solution of caustic soda in water, making such solution equal in strength to 10° or 11° Baumé. This mixture is boiled until saponification takes place, when ninety parts more of water are added, and the whole again boiled until the ingredients are thoroughly combined. This constitutes a soda soapy compound. To this I add a potash soapy compound thus prepared: seventy parts of a solution of caustic potash, equal to 8° or 10° degrees Baumé, are boiled with thirty pounds of a fish or vegetable oil (either whale-oil or linseed-oil) until saponified. The two soapy compounds, being thoroughly mixed by boiling, are poured into a vessel containing one hundred and fifty parts of the greasy oil distilled from the crude oil of coal, and the whole is then mixed together by stirring until it begins to acquire a thick consistence by cooling, when it may be allowed to remain.

The foregoing is my mode of making a solid grease suitable for the journals of railway-carriages or various other mechanism.

A liquid grease for ordinary machinery I prepare by altering the proportions. I mix two parts of the greasy coal-oil with one part of a soapy compound prepared by taking one part of the combined soapy compounds employed for making the solid grease and adding eight parts of water.

I am aware of an animal or vegetable oil or fat, caustic alkali and water having been used in combination with mercury or mercurial amalgam, plumbago, and lamp-black for the purpose of making a lubricating composition. I am also aware that tallow, oil, rosin, and spirits of turpentine have been employed together to constitute a lubricator; also, that a lubricating-oil has been produced from the distillations of rosin. My invention differs from all of them.

I am also aware that heavy oils resulting from the distillation of bituminous substances have been used, alone or mixed with fatty or oily bodies, for the purpose of lubricating machinery; but experience has proved that in either of these states the heavy oil separates from and cannot be made to adhere to the frictional surfaces of the machinery, which thus become bare and exposed to the oxidating influence of the atmosphere. Now, the peculiar feature of my invention consists in combining the heavy oils obtained from the distillation of coal and other bituminous substances with saponaceous compounds, such as I have described previously, and by which the oil is kept in contact with those parts of the machinery most exposed to attrition, so as not only to prevent access of air to the metallic surface, but to diminish friction, and thereby avoid any undue evolution of caloric. Another advantage and great peculiarity in the combination of these bituminous oils with saponaceous compounds is that at a temperature of about 60° or 70° Fahrenheit the bituminous oil makes a perfect combination with the soapy matters, quite liquid and fit for lubricating, while without the combination with bituminous oil the soapy matter at this temperature would be comparatively solid and totally unfit as a lubricating agent. This quality of rendering soapy compounds liquid at low temperatures forms an important characteristic in these oils, rendering them peculiarly valuable as lubricating agents when in combination with saponified fats or oils.

I claim—

The combination of the coal-oil or heavier oily product resulting from the second distillation of bituminous coal (or a matter that will so produce a like oil) with a saponified vegetable, animal, or fish oil or fat, and whether the coal-oil be combined with the vegetable, animal, or fish oil or fat after or during the saponifying process, the said composition being intended as a lubricator for machinery.

WILLIAM LITTLE.

Witnesses:
  JNO. ALCOCK,
  GEO. PITT,
Both of 4 Old Square, Lincoln's Inn.